No. 886,409. PATENTED MAY 5, 1908.
W. T. RICHARDS.
QUICK ACTION TRIPLE VALVE FOR AIR BRAKES.
APPLICATION FILED JULY 19, 1907.
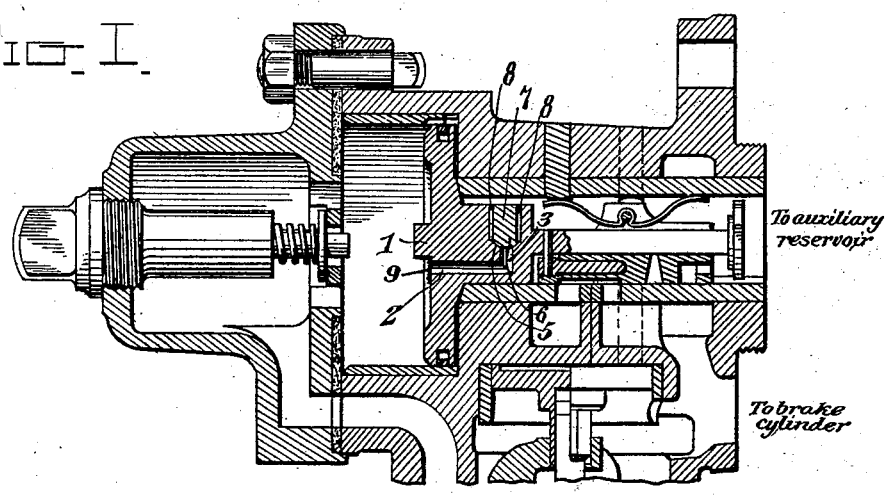
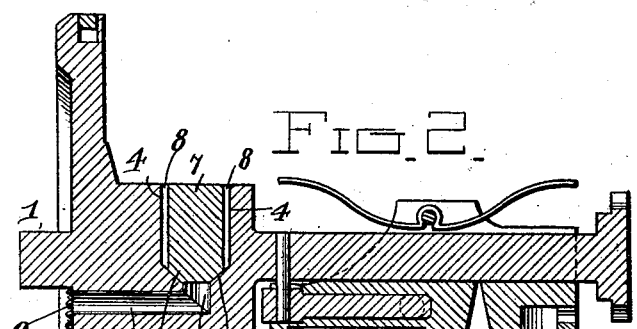
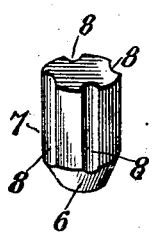
W. T. RICHARDS
Inventor
Witnesses

UNITED STATES PATENT OFFICE.

WILLIAM T. RICHARDS, OF COLORADO CITY, COLORADO, ASSIGNOR OF ONE-FOURTH TO CARL S. CHAMBERLAIN, ONE-EIGHTH TO CHARLES D. TAYLOR, AND ONE-EIGHTH TO JOHN McCOACH, OF COLORADO CITY, COLORADO.

QUICK-ACTION TRIPLE VALVE FOR AIR-BRAKES.

No. 886,409.      Specification of Letters Patent.      Patented May 5, 1908.

Application filed July 19, 1907. Serial No. 384,603.

*To all whom it may concern:*

Be it known that I, WILLIAM T. RICHARDS, a citizen of the United States, residing at Colorado City, in the county of El Paso and State of Colorado, have invented a new and useful Quick-Action Triple Valve for Air-Brakes, of which the following is a specification.

The invention relates to improvements in quick action triple valves for air brakes.

The object of the present invention is to improve the construction of the Westinghouse and New York quick action triple valves, and to provide a simple, inexpensive and efficient device, adapted to be readily applied to quick action triple valves without materially increasing the cost of the same, and capable of enabling the auxiliary reservoir to be charged in the shortest possible time, thereby affording greater control and more rapid operation of the air brakes.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a vertical sectional view of a portion of a quick action triple valve, provided with my improvements. Fig. 2 is an enlarged detail sectional view of the triple piston and the parts carried thereby. Fig. 3 is a detail perspective view of the gravity check valve.

Like numerals of reference designate corresponding parts in all the figures of the drawing.

1 designates the triple piston of a quick action passenger triple valve of the Westinghouse type, provided with a passage or port 2, consisting of a horizontal branch and a vertically disposed radially arranged branch 3. The horizontal branch, which is located near the center of the piston, extends from the train pipe or pressure side of the same to the opposite side thereof, and the vertical branch extends upwardly from the horizontal branch through the upper portion of the stem of the triple piston, and has its outlet at the auxiliary reservoir side of the triple piston, as clearly illustrated in Fig. 1 of the drawing. The vertical branch 3 has its upper portion enlarged to form a valve chamber 4 and to provide a valve seat 5, which is inclined to fit a tapered lower end 6 of a gravity check valve 7. The gravity check valve 7, which is located in the chamber 4 of the auxiliary side of the triple piston, is provided above its tapered seat engaging portion with a plurality of longitudinal grooves 8, extending to the top of the valve and forming a plurality of air passages, when the valve is moved upwardly from its seat by an excess of pressure on the train pipe or pressure side of the piston head, whereby a direct communication through the piston is established between the train pipe or pressure side and the auxiliary reservoir side of the triple piston.

The stem of the piston, which is enlarged at the radially arranged branch 3 and the valve chamber, has its bottom sides or portions fitted against the casing, and its upper side or portion is spaced from the casing to provide an intervening space. The valve is arranged wholly within the valve chamber with its outer end flush with the exterior of the enlarged portion of the stem when the branch at the train pipe or pressure side of the piston is equal to or less than the pressure at the auxiliary reservoir side of the piston, and when the pressure at the train pipe or pressure side is increased, or is in excess of the pressure at the other side of the piston, the outward movement of the valve is limited by the triple valve casing, the valve moving upward through the said intervening space until it comes in contact with the casing.

When the train pipe pressure is in excess of the auxiliary reservoir pressure, the check valve 7 will move upwardly from the seat, and the air will pass through the port or passage 2 into the auxiliary reservoir, and when the pressure is equalized, the valve will drop by gravity to its seat 5. Any reduction of pressure in the train pipe will not operate or affect the check valve, which will be held firmly on its seat by gravity and also by the excess of pressure in the auxiliary reservoir, and the triple valve will operate in the usual manner in applying and releasing the brakes.

The port or passage 2 and the check valve will enable the auxiliary reservoir to be charged in the shortest possible time, and it has been found by practice that the auxiliary reservoir may be charged from zero to seventy pounds in seven seconds, and that it may be re-charged almost instantly after a service application of the brakes. This will enable the brakes to be almost immediately applied after releasing them, and greater control of the brakes is afforded and a more rapid application of the same may be effected than heretofore.

The port of passage 2 may be of any desired diameter to enable the auxiliary reservoir to be charged with the desired rapidity, and it will be apparent that quick action triple valves may be equipped with the improvement without materially increasing their cost, and that the check valve may be readily cleaned when the triple piston is removed for cleaning. The triple piston is equipped with a piece of wire gauze 9, which is arranged over the port or passage 2, to exclude accumulation. The check valve is applicable to both passenger and freight quick action triple valves, and owing to the simplicity of the check valve and its arrangement, triple valves may be equipped with the improvement in a comparatively short time.

Having thus fully described my invention, what I claim as new and desire to secure by Letters Patent, is:—

In a quick action triple valve, the combination with a triple valve casing, of a triple piston having its stem enlarged adjacent to its head, the enlarged portion fitting against the casing at one side and separated from the casing at the opposite side to provide an intervening space, said piston being provided with a longitudinal passage extending through the piston from the train pipe or pressure side and provided at the auxiliary or reservoir side in the enlarged portion of the stem with a radially arranged branch, the latter being enlarged to form a valve chamber and tapered at the inner end to provide a valve seat, and a check valve operating in the valve chamber and provided with a tapered inner end to engage the valve seat and having a plurality of longitudinal grooves extending outward from the tapered end to the outer end of the check valve to form air passages, said check valve being located wholly within the valve chamber with its outer end substantially flush with the exterior face of the enlarged portion of the piston when the pressure at the train pipe or pressure side of the piston is equal to or less than that at the auxiliary reservoir side, and the outward movement of the valve being limited by the triple valve casing when the pressure at the train pipe or pressure side is in excess of that at the auxiliary reservoir side.

In testimony, that I claim the foregoing as my own, I have hereto affixed my signature in the presence of two witnesses.

WILLIAM T. RICHARDS.

Witnesses:
W. G. BELL,
N. B. HAMES.